United States Patent
McKee et al.

(10) Patent No.: US 12,339,872 B2
(45) Date of Patent: *Jun. 24, 2025

(54) UPDATING TRANSACTIONS IN A DISTRIBUTED DATABASE WITH A LEADER SYSTEM AND FOLLOWER SYSTEM

(71) Applicant: Wealthfront Corporation, Palo Alto, CA (US)

(72) Inventors: Austin Douglas McKee, Greeneville, TN (US); Julien Daniel Wetterwald, San Mateo, CA (US)

(73) Assignee: Wealthfront Corporation, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/421,908

(22) Filed: Jan. 24, 2024

(65) Prior Publication Data
US 2024/0248912 A1   Jul. 25, 2024

Related U.S. Application Data

(63) Continuation of application No. 17/723,448, filed on Apr. 18, 2022, now Pat. No. 11,914,617.

(60) Provisional application No. 63/176,856, filed on Apr. 19, 2021.

(51) Int. Cl.
G06F 16/27     (2019.01)
G06F 16/23     (2019.01)
G06F 16/2455   (2019.01)

(52) U.S. Cl.
CPC ........ G06F 16/275 (2019.01); G06F 16/2358 (2019.01); G06F 16/2379 (2019.01); G06F 16/24556 (2019.01); G06F 16/273 (2019.01)

(58) Field of Classification Search
CPC ............... G06F 16/275; G06F 16/2358; G06F 16/2379; G06F 16/24556; G06F 16/273; G06F 16/27
See application file for complete search history.

(56) References Cited

U.S. PATENT DOCUMENTS

| | | | |
|---|---|---|---|
| 11,954,124 B2 | 4/2024 | McKee et al. | |
| 2002/0091697 A1* | 7/2002 | Huang | G06F 16/9535 |
| 2006/0064408 A1* | 3/2006 | Enbutsu | G06F 16/2343 |

(Continued)

OTHER PUBLICATIONS

Office Action, U.S. Appl. No. 17/723,481, filed May 9, 2024, 24 pages.

(Continued)

*Primary Examiner* — Cam Y T Truong
(74) *Attorney, Agent, or Firm* — Fenwick & West LLP

(57) ABSTRACT

A follower system and a leader system store records for a plurality of users. Each of the follower system and the leader system stores at least a record for a user. Each of the follower system and the leader system stores a private log and a public log. The public log is periodically synchronized across the follower system and the leader system. The private log of each system is maintained independent of the other system. The follower system transmits information stored in the public logs to the leader system for synchronizing the public logs of the follower system and the leader system in response to updating the public logs with information describing the second set of transactions.

26 Claims, 9 Drawing Sheets

(56) References Cited

U.S. PATENT DOCUMENTS

| | | | |
|---|---|---|---|
| 2014/0156530 A1* | 6/2014 | Suitner | G06Q 20/20 |
| | | | 705/44 |
| 2015/0032586 A1* | 1/2015 | Blackhurst | G06Q 30/0631 |
| | | | 705/35 |
| 2018/0091316 A1 | 3/2018 | Stradling et al. | |
| 2018/0260125 A1 | 9/2018 | Botes et al. | |
| 2018/0262591 A1* | 9/2018 | Jugovic | H04L 12/14 |
| 2018/0349458 A1 | 12/2018 | Guirguis et al. | |

OTHER PUBLICATIONS

Office Action, U.S. Appl. No. 18/600,607, filed Sep. 12, 2024, 15 pages.

* cited by examiner

UPDATING TRANSACTIONS IN A DISTRIBUTED DATABASE WITH A LEADER SYSTEM AND FOLLOWER SYSTEM

CROSS-REFERENCE TO RELATED APPLICATIONS

This application is a continuation of U.S. application Ser. No. 17/723,448, filed Apr. 18, 2022, which claims the benefit of U.S. Provisional Application No. 63/176,856, filed on Apr. 19, 2021, which are incorporated by reference in their entirety.

BACKGROUND

This disclosure relates generally to database systems, and more specifically to updating of records stored in a distributed database system.

Enterprises often use database systems, for example, for storing records for users. Enterprises store copies of data in multiple systems, for example, to support availability or liveness so that users can access their records in at least one of the systems if the other system is down. Maintaining consistency of data across distributed systems when data is updated has challenges. Some distributed systems enforce updates to be allowed only in one of the systems, designated as a master system. The master system propagates the updates to other systems. Users are not allowed to update their records in systems other than the master system. As a result, if the master system is down, the users can access their data but are not able to update their data. Some distributed systems allow users to update their record in any of the systems. However, these distributed systems run into update conflicts. In case of simultaneous updates in two systems, the distributed system needs to resolve the conflicts and determine the final value of the record. Updating such conflicts is challenging and may involve manual intervention resulting in complexities in processing the requests as well as delays in processing of the requests. Blockchain technology is used for performing updates in a distributed system. Blockchains have strong guarantees, but they introduce a significant amount of technological complexity and are often high latency with low throughput. Systems may require interactions with other third party systems that have latency and transaction bandwidth requirements that make any system backed or settled by a blockchain infeasible.

SUMMARY

The above and other issues are addressed by a computer-implemented method, computer system, and computer readable storage medium for processing updates to records in a distributed system. A follower system and a leader system store records for a plurality of users. Each of the follower system and the leader system stores at least a record for a user. Each of the follower system and the leader system stores a private log and a public log. The public log is periodically synchronized across the follower system and the leader system. The private log of each system is maintained independent of the other system. The follower system executes a first set of transactions based on the record of the user such that information describing the first set of transactions is stored in the private logs. The information stored in the private logs is not provided to the other system. The follower system executes a second set of transactions based on the record of the user such that the information describing the second set of transactions is stored in the public logs. The follower system transmits information stored in the public logs to the leader system for synchronizing the public logs of the follower system and the leader system in response to updating the public logs with information describing the second set of transactions.

According to an embodiment, the follower system and a leader system store records for a plurality of users. Each of the follower system and the leader system stores at least a record for a user. Each of the follower system and the leader system stores a private log and a public log. The public log is periodically synchronized across the follower system and the leader system. The private log of each system is maintained independent of the other system. The follower system receives a set of update requests. Each update request specifies a proposed increase in the value of the field of the record of the user. The follower system executes a set of transactions corresponding to each of the update requests of the set of update requests. The follower system stores information describing the set of transactions in the set of private logs. The set of transactions are executed prior to synchronizing public logs with the leader system. The follower system further receives a new update request specifying a proposed decrease in the value of the field of the record of the user. The follower system synchronizes changes to the public logs with the leader system in response to receiving the new update request.

According to an embodiment, each of the leader system and the follower systems enforce a constraint based on an aggregate of the values stored in the records of the plurality of users. The coordinator system receives periodically from at least one of the leader system or the follower system, a summary of changes in public logs. The coordinator system transmits instructions to the follower system to execute one or more transfer transactions with the leader system based on the summary of changes in the public logs. The follower system executes a transfer transaction based on the instructions received from the coordinator system.

Embodiments of a computer readable storage medium store instructions for performing the steps of the above method. Embodiments of the computer system comprise one or more computer processors and a computer readable storage medium store instructions for performing the steps of the above method.

The features and advantages described in this summary and the following detailed description are not all-inclusive. Many additional features and advantages will be apparent to one of ordinary skill in the art in view of the drawings, specification, and claims hereof.

BRIEF DESCRIPTION OF THE DRAWINGS

The teachings of the embodiments can be readily understood by considering the following detailed description in conjunction with the accompanying drawings.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Organizations store information describing users in records representing user accounts. Organizations allow users to perform operations that affect values of fields stored in the records. Certain operations may increase values of fields and others decrease values of the fields. Organizations may allow these operations to be performed via multiple systems to increase availability of the system. Organizations may have to enforce certain constraints based on the values stored in fields of the user records. If users are allowed to perform operations that affect values of the fields via multiple systems, the system environment encounters a set of problems including synchronization of values of fields across multiple systems, verifiability (all systems must be able to prove correctness of values), liveness (failure or downtime at one system should minimally affect others), privacy (parties may wish to withhold or hide some parts of their transactions from the other) and safety.

The multiple systems can address some of these problems by using a third party system that controls and synchronizes the records of users across the multiple systems. This solution has the same major downside of any centralized system: the two systems depend on the correctness and uptime of this third party external system. This would sacrifice the liveness property of the system and in some cases the verifiability. Another solution is blockchain technology. Blockchains have strong guarantees in synchronization, verifiability, liveness and safety, but they introduce an incredible amount of technological complexity and are often high latency with low throughput. Most importantly though, these two solutions are fundamentally incompatible with the goals of the systems maintaining user records. Performing transactions based on user accounts may require interactions with other third party systems that have latency and transaction bandwidth requirements that make any system backed or settled by a blockchain infeasible.

Embodiments provide a system architecture that allows such distributed system to allow updates to fields of user records while supporting synchronization of values of fields across multiple systems, verifiability, liveness, privacy, and safety

System Environment

Figure 1:
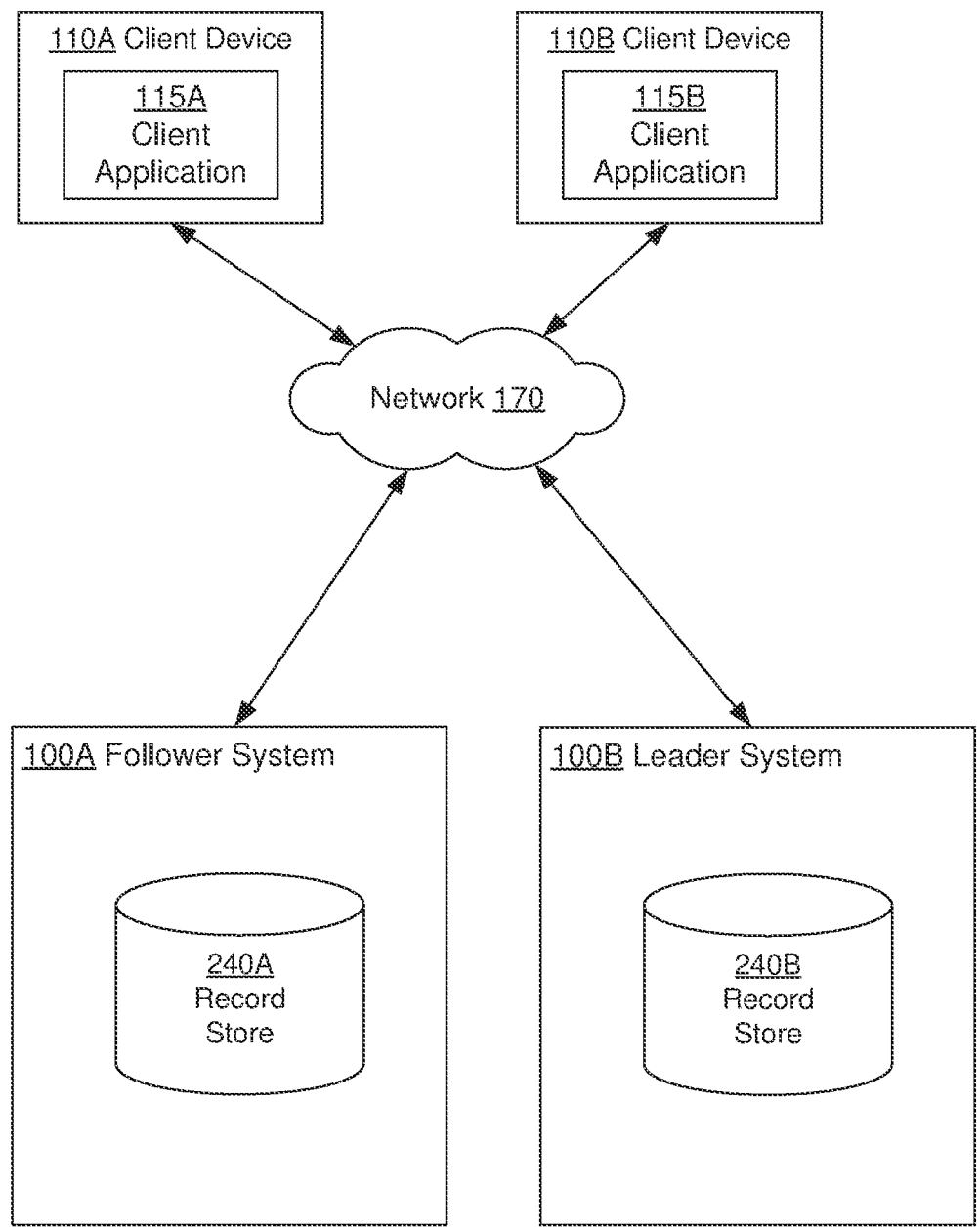
FIG. 1 is a block diagram of a system environment including a follower system and a leader system, in accordance with an embodiment.

FIG. 1 is a block diagram of a system environment including a follower system and a leader system, in accordance with an embodiment. The system environment 105 is a realtime, bi-directional system of communication between two systems storing user records along with a set of rules the systems must follow to manage values of certain fields of the user record. The system environment 105 provides a watertight, higher-level system that solves the problems of synchronization, verifiability, liveness and safety. Additionally, one of the involved systems (the leader system 100B) is allowed to connect to an external interface and through it authorize certain transactions performed by users, for example, transactions that decrease the values of certain fields of the user record while maintaining safety and resiliency to downtime at the other system (the follower system 100A).

The system environment 105 comprises a follower system 100A, a leader system 100B, one or more client devices 110A, 110B, and a network 170. Other embodiments may have more of fewer systems within the system environment 105. Functionality indicated as being performed by a particular system or a module within a system may be performed by a different system or by a different module than that indicated herein.

FIG. 1 and the other figures use like reference numerals to identify like elements. A letter after a reference numeral, such as "110A," indicates that the text refers specifically to the element having that particular reference numeral. A reference numeral in the text without a following letter, such as "110," refers to any or all of the elements in the figures bearing that reference numeral (e.g. "110" in the text refers to reference numerals "110a" and/or "110n" in the figures).

User records are stored in both follower system 100A and leader system 100B. The user records of the follower system 100A are stored in the record store 240A and the user records of the leader system are stored in the record store 240B. Users are allowed to make updates in either of the systems, i.e., leader system 100B or follower system 100A. The follower system 100A, yields to the leader system 100B when allowing users to perform operations that propose decrease in values of fields of the user records. The follower system 100A periodically synchronizes field values and settles with the leader system 100B. The leader system connects to external systems, for example, systems that authorize certain transactions. The leader system 100B allows users to perform transactions that decrease values of the fields of the user record. The leader system 100B periodically synchronizes field values with the follower system 100A. Each system may be associated with a different organization, for example, a financial institution or any other type of institution that allows users to perform operations that affect values of fields of user records.

The two systems 100A and 100B maintain private logs and public logs. A log stores information describing changes in the fields of the user records as well as the resulting value of the fields of the user records. A log may also be referred to herein as a ledger. Private logs of a system are not shared with the other system. For example, the follower system 100A may perform operations that are stored in the private log of the follower system 100A and are not shared with the leader system 100B. Similarly, the leader system 100B may perform operations that are stored in the private log of the leader system 100B and are not shared with the follower system 100A. However, information stored in the public log is shared with the other system. The two systems 100A and 100B synchronize their public logs periodically to make sure that information stored in the two public logs is consistent and the fields in the user records of the system are consistent with the values and changes specified in the public logs. The use of private logs and public logs allows the systems to perform operations to the records of a user such that some operations are treated as private by the system and some are treated as public. Accordingly, each system 100A and 100B may choose to perform some operations privately without sharing with the other system and some operations as public operations that are shared with the other system while maintaining eventual consistency of field values of records of the user. The private log may also be referred to herein as private ledger and public log referred to as public ledger or joint ledger.

The system environment 105 may include multiple client devices 110. A client device 110 is a computing device such as a personal computer (PC), a desktop computer, a laptop computer, a notebook, or a tablet PC. The client device 110 can also be a personal digital assistant (PDA), mobile telephone, smartphone, wearable device, etc. The client device 110 can also be a server or workstation within an enterprise datacenter. The client device executes a client application 115A, 115B for interacting with the systems 100, for example, a browser. Although, FIG. 1 shows two client devices, the system environment 105 can include many more client devices 110.

Figure 2:
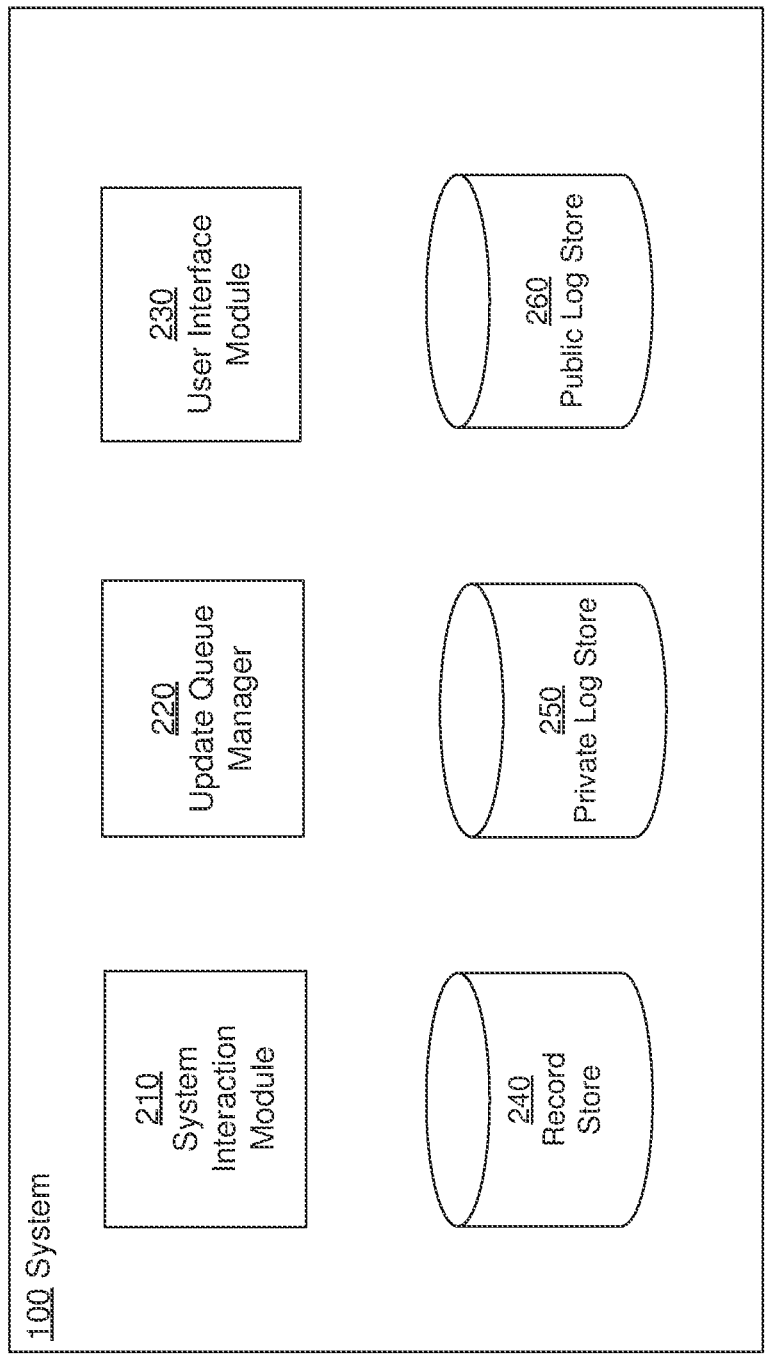
FIG. 2 shows the system architecture of a follower system or a leader system, in accordance with an embodiment.

FIG. 2 shows the system architecture of a follower system or a leader system, in accordance with an embodiment. The system 100 includes a system interaction module 210, an update queue manager 220, a user interaction manager 230, a record store 240, a private log store 250, and a public log store 260. Other embodiments may include more or fewer components. Each of the follower system or the leader system may include components different from the other system. However, the components shown in FIG. 2 are included in both follower system and leader system.

An application of the described system is to allow synchronization of balances between organizations (e.g., financial institutions) in order to allow multiple accounts at different institutions to appear as one while allowing downtime between systems of the organizations and disallowing double-spending of funds. The techniques disclosed may be applied to applications other than those described herein.

The system interaction module 210 manages interactions between the follower system 100A and the leader system 100B. The update queue manager 220 manages an update queue that propagates changes made in one system to the other system.

The user interaction manager 230 allows users to interact with the system. For example, users may interact via a client application running on a client device to perform operations that may either increase the value of a field of the record of a user or decrease the value of the record of the user. For example, if the record represents an account of a user in a financial institution, a deposit operation increases the value of the field and a withdrawal operation decreases the value of the field.

The record store 240 stores records of users. A record includes fields, each field storing a value. For example, if the system is associated with financial institution, a field may represent a value of an account of the user with the financial institution. The values of the fields may change in response to operations.

The private log store 250 stores the private logs of the system. The public log store 260 stores the public logs of the system. In an embodiment, the public log store represents a transaction record of an user's balance over time, that becomes eventually consistent between the two systems 100. The private log store contains records of incoming or outgoing funds at each institution corresponding to the systems 100A and 100B. An institution, by delaying log entries from flowing to the update queue, is allowed to temporarily hide credits from the other institution for security/fraud prevention purposes. Each log includes log entries. According to an embodiment, log entries represent changes in an account balance. Each of the two institutions runs a system 100 to independently authorize outgoing transactions while only asynchronously sending balance updates between each other. A log entry may represent a tuple of data containing (1) the 'application received' timestamp indicating a time that a request for an operation was received (2) the proposed change (delta) of the value of a variable known jointly between involved parties, usually a number. The proposed change is specified in a request for an operation. Each log store includes all historical log entries. Each instance of the system 100 stores logs in its own log stores. Log entries are first accepted into the system's private log store then at some later time added to the public log store.

According to an embodiment, the system maintains a log total representing the sum of all accepted log entry changes. A system may sub-divide the log total. The current, observed value of the log total in the two systems 100A and 100B may be temporarily different from each system's point of view but is eventually consistent and converges to the same value. The log total may represent the sum of the account balances between two institutions, or how much a user of these institutions believes they have to spend.

Two organizations (or parties) may run the systems 100A and 100B such that the first organization is associated with the follower system and a second organization is associated with the leader system. The two organizations (or parties)t obey invariants of certain protocol. The systems 100A and 100B may also be referred to herein as applications.

According to an embodiment, the follower system 100A accepts new asynchronous log entries from end user. The follower system 100A yields to the leader system 100B when competing log entries violate invariants. The follower system 100A, continually (or periodically) synchronizes log entry totals with the leader system 100B.

The leader system 100B accepts and validates new realtime log entries from an end-user. The leader system 100B continuously (or periodically) synchronizes new log entries with the follower system 100A. According to an embodiment, the leader system is associated with an organization, for example, a financial institution. A single financial institution can designate their system 100 as the leader, allowing the institution to connect to realtime payment rails like a debit card network. The value of the log total of their copy of the public log store is used to authorize card spends by users.

Private and Public Logs

The two systems 100A and 100B keep private log stores and calculate private log totals. A system 100 may store log entries in the log store that are not in the public store. The systems 100 use the separation of private logs and public logs as a mechanism to hide a subset of data from the other system and keep it private.

Figure 3:
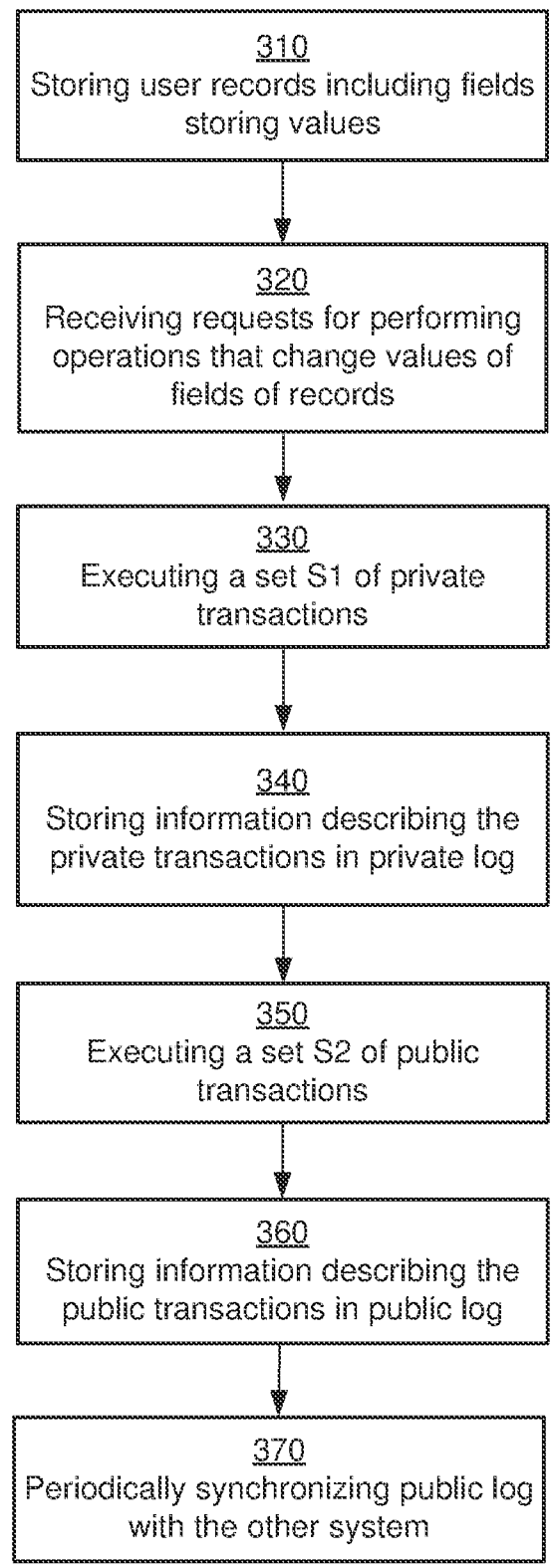
FIG. 3 is a flowchart of the process illustrating use of private logs and public logs, in accordance with an embodiment.

FIG. 3 is a flowchart of the process illustrating use of private logs and public logs, in accordance with an embodiment.

A system 100 (e.g., system 100A or 100B) stores 310 user records. Each record includes one or more fields that store values. Users perform operations that may change values of the fields. Accordingly, the system 100 receives 320 requests for performing operations that change values of the fields of records. For example, an organization such as a bank may store user accounts as records and examples of operations include deposits and withdrawals.

The system 100 executes 330 a set S1 of transactions that are referred to as private transactions since the system does not provide the details of these transactions to the other system. For example, the system 100A may perform a set of transactions and not provide the details of the transactions to the system 100B. Similarly, the system 100B may perform a set of transactions and not provide the details of the transactions to the system 100A. The system 100 stores 340 the information describing the private transactions in the private logs. The information describing the private transactions that are stored in the private logs is not stored in the public logs and hence not shared with the other system.

The system 100 executes 350 a set S2 of public transactions that the system decides to share with the other system. For example, the system 100A may perform a set of transactions and provide the details of the transactions to the system 100B. Similarly, the system 100B may perform a set of transactions and provide the details of the transactions to the system 100A. The system 100 stores 360 the information describing the public transactions in the public logs of the system 100. Each of the follower system 100A and leader system 100B periodically synchronizes 370 the public logs of the system with the other system. For example, the system 100A may share the public logs of the system 100A with the system 100B. Similarly, the system 100B may share the public logs of the system 100B with the system 100A. If a source system 100 sends the public logs to a target system 100, the target system identifies one or more transactions for the user from the public log received that were executed by the source system and performs equivalent operations in the corresponding records of the user of the target system.

Upon receiving transaction log details of the public logs from an opposing system, each system incorporates the public log data into its own representation of the public log. The log represents a timestamped series of records representing updates to user-specific values. The system processing the public logs received from the other (opposing) system stores new records corresponding to transactions determined based on the public logs received and stores these new records in order of the given timestamps to storage media. The system further applies the update operation represented by the record to the user-specific value of the field of the record that is currently stored in the system. For example, because these values are typically numbers, the log record tuple (User 123, Time 2020-01-27T12:24:35, Update +12.34) could be inserted into a local database in timestamp order, then the current number value for user 123 would be incremented by 12.34. Accordingly, the system determines a change to the field value of the record that is equivalent to a transaction determined from the public log that is received. The system, also determines the timestamp corresponding to the transaction. The system applies the changes to the field value that is stored in the system in the order of the timestamps of various transactions extracted from the public log received.

Assume that one of the system (selected from the follower system and the leader system) is system Sx and the other system is Sy. Assume that Sx executed a transaction Tx at time t1 and Sy executes a transaction Ty and time t2. Assume that t1 occurs before t2. The system Sx sends information describing Tx via the public logs to Sy and the system Sy sends information describing Ty via the public logs to Sx. Accordingly, both systems eventually performs operations corresponding to the transactions Tx and Ty.

In an embodiment, the system 100 determines to share a set of transactions but decides to delay the sharing by a time interval. For example, the system may decide to keep a set of transactions private for a particular time interval and then send to the other system. The length of the time interval may be configurable by a user or automatically determined by the system based on a set of predefined rules. For example, if the value of a certain field of the user record is below (or above) a threshold value, the system may delay reporting the transactions for a predetermined length of time interval. The system may delay reporting certain transactions while the field value is below (or above) certain threshold. Accordingly, the system may make the transactions public once the value of the field reaches a threshold value.

The public log store stores records of all log entries over time that each system chooses to make public. Tracked independently between systems, but given enough uptime between the system the public logs converge to be identical sets of records across the two systems 100A and 100B. All the log entries and log totals for every user eventually match between the multiple systems 100. Different log totals for users may be tracked as the system requires. For example, a banking application may track a user's available balance separate from a ledger balance.

Figure 5:
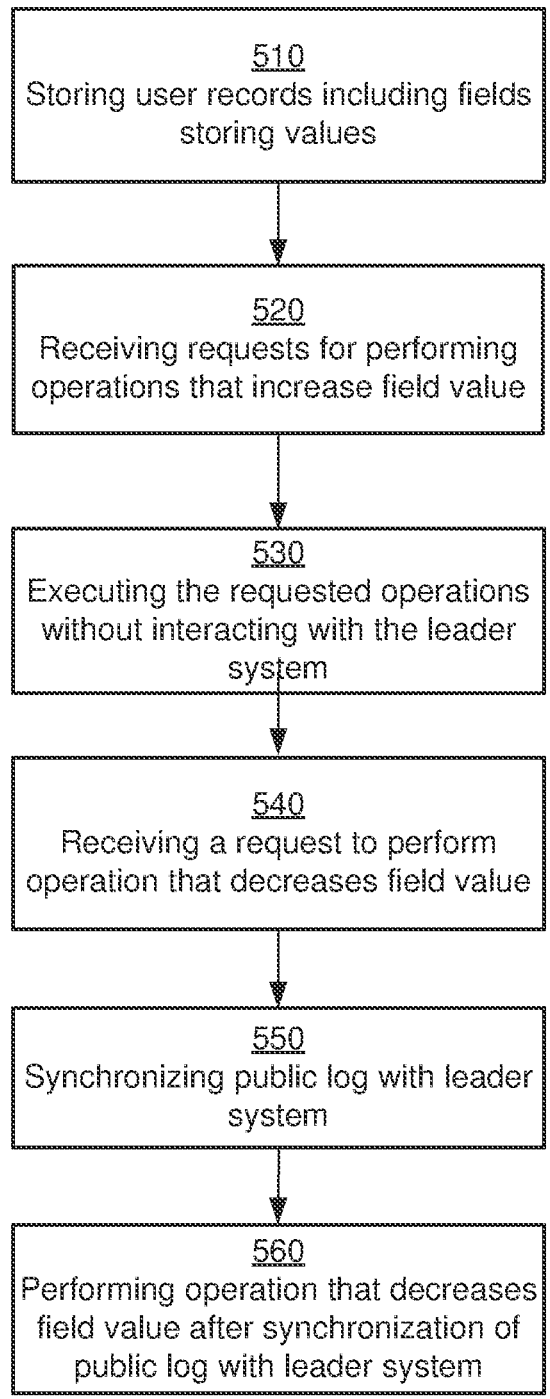
FIG. 5 shows interactions between a follower system and a leader system, in accordance with an embodiment.

All changes a system makes to their own private log store are be copied, with an optional time delay, to each system's public log store and also their update queue (E and G shown in FIG. 5.) This time delay allows a system to temporarily hide log entries from the other system while retaining the desired system properties. For example, in the context of a banking application, the follower system may receive a deposit (request with proposed increase of field value), but for risk reasons may not want the value to be spendable by the leader system for certain time interval (say three days). The deposit is represented as a log entry requesting an increase in account balance, and while the log entry would be represented on follower system's private log store, the leader system does not learn about this balance increase until a time interval is passed (that may be multiple days later) when the follower system provides the information to the leader system.

Figure 4:
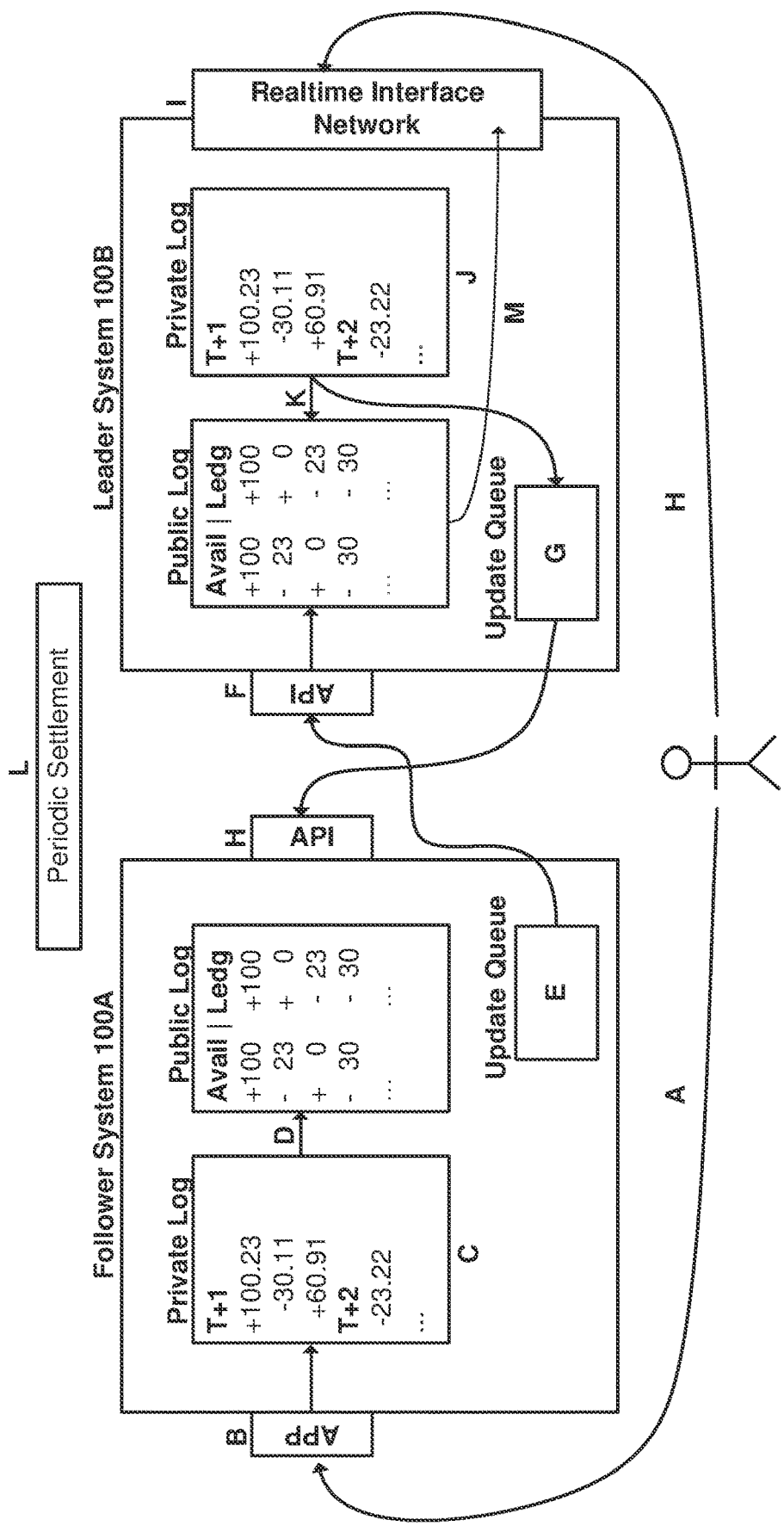
FIG. 4 shows a flowchart of the process for performing operations that decrease a field value vs. increasing the field value, in accordance with an embodiment.

FIG. 4 shows interactions between a follower system and a leader system, in accordance with an embodiment. Each system 100A, 100B may be associated with an institution, for example, a financial institution or any other type of organization. As shown in FIG. 4 the two systems keep private logs that store operations associated with the users record, for example, changes to the user's balance in the system in a private manner. These records and balances are not provided by the system to the other system. The data stored in private logs is independent of changes to the public or joint logs originating from the other system. Each private logs however incorporates balance changes made by a user in the system (e.g., steps A/B, H/I shown in FIG. 4.)

The public log stores information describing the values of the field and changes to the field of the record. For example, the public log may represent a record of a user's balances over time, tracked independently between system. However, given enough uptime between the systems, the public logs converge to be identical records. According to an embodiment, each user has two balances in the public logs: a public log balance (also referred to as a joint ledger balance) tracking the user's total value, and the joint available balance, which subtracts pending operations that may change the field value, for example, pending debits.

Each private log store does not contain any log entries originating from the other system 100. Each private log store however incorporates log entries made by users through their own system (identified as steps A/B and H/I in FIG. 4.)

The steps D and K copy out values of the private logs. All changes a system 100 makes to its own private logs are copied, with an optional time delay, to the systems public logs. The information is also provided to the update queue (E and G). This time delay allows systems to temporarily hide the field values (e.g., a spendable balance) from the other system while retaining the desired system properties. For example, system 100A may receive a request for increase in the field value (e.g., a request for a deposit), but for risk reasons may not let the value to be spendable by system 100B for a time interval, e.g., three days. This step is executed at some point but system 100A may optionally delay it for some time (e.g., three days) before adding to the public logs (the two systems though must still perform both copy operations at the same time). These steps may be performed by system 100B, for example, system 100B may perform certain operations and delay reporting to the system 100A.

Each system, may apply changes to their own copy of the public logs instantly. However, the system persists identical balance updates bound for the other system in some durable queue (e.g., E and G in FIG. 4.) Balance updates in the follower system's queue (E) may be netted and simplified before being polled. This allows for largely independent operation of the systems in case of communication failure. For instance, the messages 'increase field of user Y by X' and 'decrease field of user Y by Z' may be netted to 'increase field of user Y by X-Z'. Accordingly, the system may aggregate a set of operations into an aggregate operation that reports the resulting value and report the aggregate operation but not provide the details of the individual operations.

Both systems support an API (application programming interface) to receive changes to the public logs (steps H and F in FIG. 4). Each institution should attempt to send to the other system all balance changes in its' update queues (E and G) as quickly as possible. If and when a system goes down or fails to confirm receipt of a balance change, the sending system may retry the change indefinitely. During periods of long downtime of one system, the other system may accumulate balance updates in its update queue. In this situation, the public logs of the two systems start diverging.

The systems perform periodic settlements (step L). The two systems may continually sweep the field values, for example, real client balances, held on the private logs, from one system to the other using information only known from their shared information on the public logs. This movement does not affect the public log but may generate entries in the private logs.

Only one of the systems is designated the leader system. This designation allows the leader system to connect to a realtime interface network (e.g., payment network like credit card payment networks) while maintaining availability and safety in the event of downtime of either institution. In addition to its other responsibilities in the system, the leader system continually pushes the joint available balance of the public logs to the realtime payment network provider.

The follower system does not have the option of connecting to a realtime network. Accordingly, operations that decrease the field values such as user withdrawals via the follower system require a negative balance update to flow from the follower system to the leader system and back, before the follower system is allowed to perform the operation. According to an embodiment, the follower system is not allowed to complete operations that decrease the field value during downtime.

Performing Operations Using the Distributed System

FIG. 5 shows a flowchart of the process for performing operations that decrease a field value vs. increasing the field value, in accordance with an embodiment. The steps shown in FIG. 5 are performed by the follower system 100A. The system 100A stores 510 user records, each record including a field that stores a value. For example, the record may represent a user account and the field represents the balance of the account. The system 100A receives 520 a set of requests for performing operations, each operation of the set requesting an increase in the value of the field. For example, each operation may represent a deposit to the user's account. The system 100A executes 530 the requested set of operations without reporting to the leader system 100B. Accordingly, the system 100A does not store the information describing the set of operations in the public logs and only stores the information in the private logs.

The system 100A further receives 540 a request that decreases the field value. For example, the request may be a withdrawal request that decreases the balance value. The system first synchronizes the public logs with the leader system and synchronizes 550 the value of the fields of the record with the values of the fields of the corresponding record for the same user in the leader system 100B. The system performs 560 the requested operation that decreases the value of the field after synchronizing the record with the leader system.

Accordingly, whether or not the follower system 100A synchronizes the record with the leader system 100B may depend on the types of operations being performed by the follower system 100A. For example, the system may performs a plurality of operations that increase the field value without synchronizing the record with the leader system 100B but is required to synchronize the record with the leader system if any operation is requested that requires the follower system 100A to decrease the value of the field. There may be other types of operations that the follower system 100A is allowed to perform without synchronizing with the leader system. For example, the follower system 100A may allow the user to use the record for performing other operations that do not decrease the value of the field and keep the value same or increase the value.

According to an embodiment, the systems 100 are associated with financial institutions that allow users to perform operations as follows. Following is a description of how a user may execute transactions that decrease the user account balance (e.g., spend) via the leader system. This manifests as realtime, negative log entry (I) to the leader system. If the leader system is online, the leader system decreases the log total in its private log store (J) by X amount. The leader system copies this log entry, 'decrease user Y by X' to the public log store and the update queue. The two system's (100A and 100B) public log stores are temporarily out-of-sync until the leader system sends 'decrease user Y by X' to the public log store of the follower system.

Following is a description of how a user may execute transactions that decrease the user account balance (e.g., spend) via the follower system. The follower system receives a request from a user to perform a transaction that decreases a field of the user record representing the user's balance. The information 'decrease user Y by X' is stored by the follower system in the follower system's private log store (C) and is copied to the follower system's public log store and update queue. If the leader system is online, the follower system submits (F) 'decrease user Y by X' to the follower system's public log store, awaiting confirmation of receipt. Withdrawing through the follower is not realtime, and the follower now waits for the success of this flow. If the leader system communicates a successful post, the follower system continues to fulfill the user's withdrawal request, and both system's (100A and 100B) public log stores are again in sync. If the leader system is offline, the follower system either waits and delays fulfillment of the withdrawal, or in severe cases of system failure, the follower system requests the realtime payment network to sever communication (I) with Leader and proceed with fulfillment.

Following is a description of how a user may execute transactions that increase the user account balance (e.g., deposit) via any one of the follower system or the leader system. Users can perform operations (or transactions) that increase the field value (e.g., deposit) through either system 100A, 100B. The information 'increase user Y by X' is entered into one of the systems' private log stores (C or J). The system then sets a time-delay release on this information to be copied. After the time has passed, 'increase user Y by X' is copied into an update queue and a local copy of the public log store. The information is then sent to the other system when the other system is online.

Accordingly, the process executed by the two systems 100A and 100B executes same steps if the requested transaction increases the field of the record (account balance) but the process executed by the two systems 100A and 100B executes different steps if the requested transaction decreases the field of the record (account balance).

Settlement Process Using the Distributed System

Figure 6:
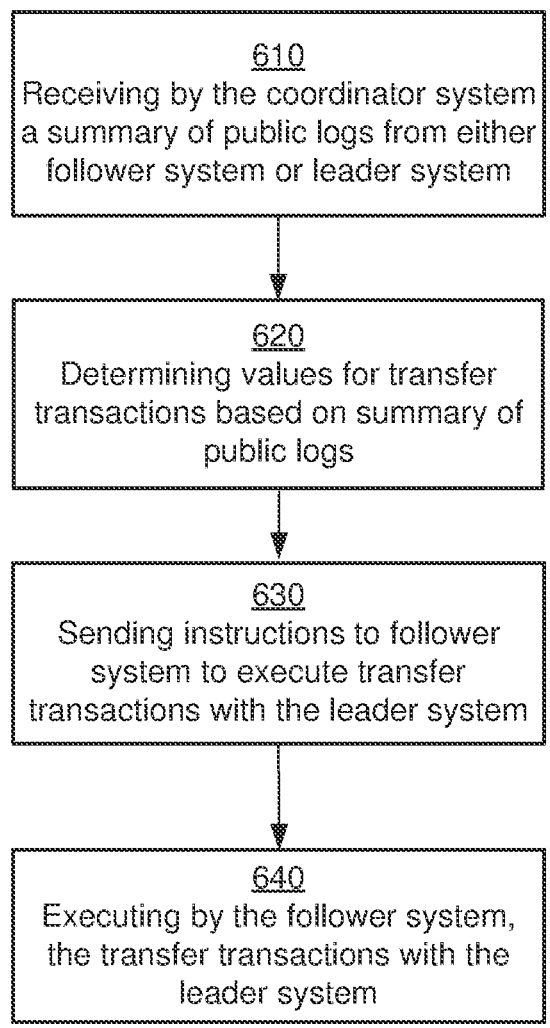
FIG. 6 shows a process executed by a coordinator system, in accordance with an embodiment.

FIG. 6 shows a process executed by a coordinator system, in accordance with an embodiment. The coordinator system represents modules that may execute as an independent system (distinct from the leader system and the follower system) or may be same as one or the leader system or the follower system.

The coordinator system receives 610 a summary of logs from either the follower system of the leader system. The coordinator system determines 620 values for performing transfer transactions between the systems 100 based on summary of public logs. The coordinator system sends 630 instructions to the follower system to execute transfer transactions (e.g., operations that perform transfer of funds) to the leader system. The follower system executes 640 the instructions received from the coordinator system to perform the transfer transactions with the leader system. Details of the process illustrated in FIG. 6 according to various embodiments are further illustrated in FIG. 7 and FIG. 8.

Institutions may enter into an agreement to hold all of each user's funds at a single institution in the steady state. It can be advantageous to enable the holding institution to maintain those balances in a sweep program (e.g., an FDIC-insured sweep program), whereby user funds deposited across all participating accounts with the holding Institution may be transferred to and maintained in interest-bearing omnibus sweep accounts at participating third party institutions (which may include the transient institution) while within the control of the holding institution.

Figure 7:
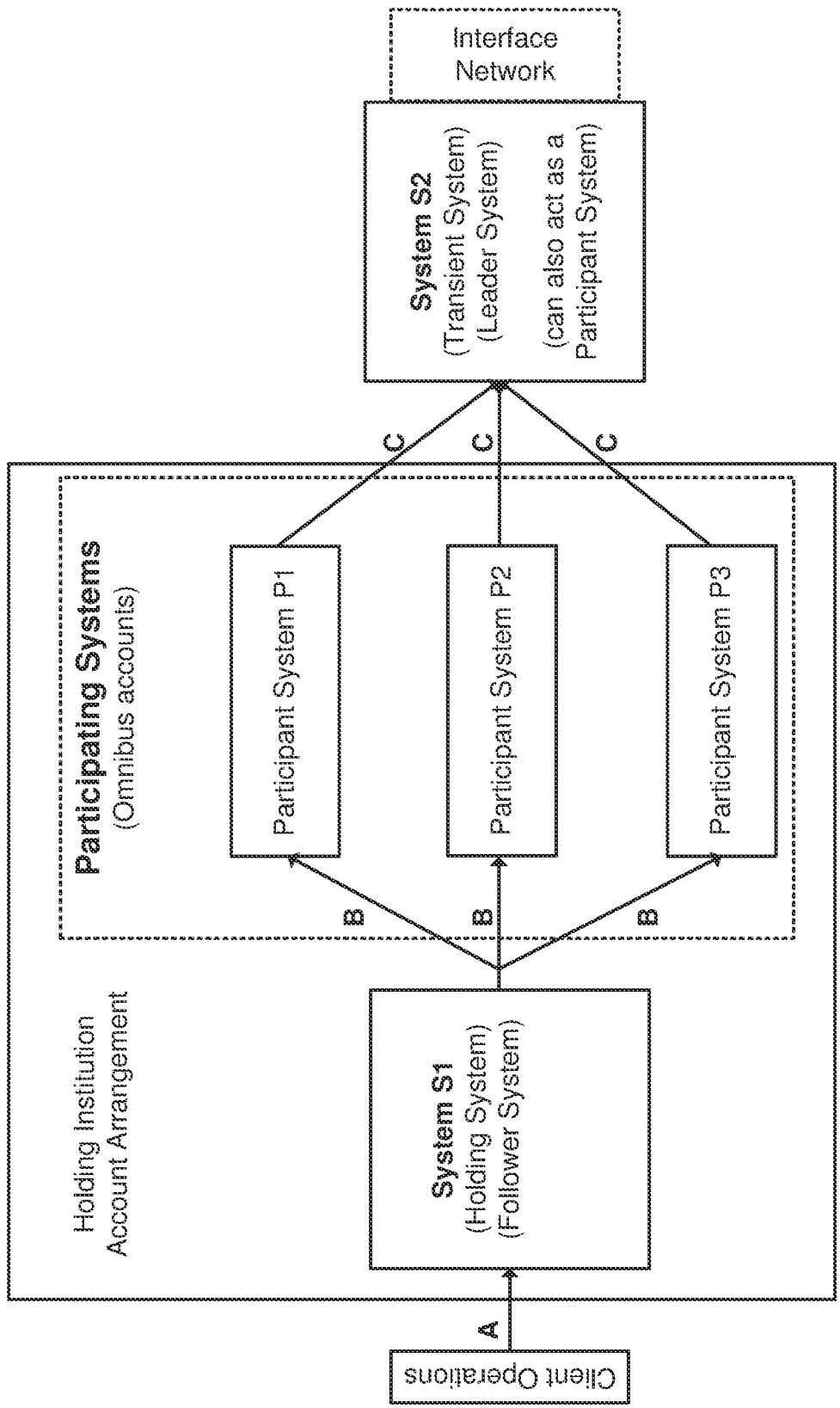
FIG. 7 shows interactions between a follower system and a leader system and a coordinator system, in accordance with an embodiment.

FIG. 7 shows interactions between a follower system and a leader system and a coordinator system, in accordance with an embodiment. FIG. 7 illustrates a sweep program arrangement of accounts and settlement. In such an arrangement, the use of multiple sweep accounts at multiple institutions can enable the holding institution to provide maximum protection for its users collectively. When user funds are deposited with the holding/follower system (step A), the public log store is updated and the funds are allocated across omnibus accounts with participating institutions (in the holding system's institution's name for the benefit of users) and transferred into these omnibus accounts to be maintained by these participating systems (step B). The funds remain in these interest-bearing omnibus accounts until such time as they are needed to settle transactions (such as card network transactions) effected through the leader system in order to return the leader system to the steady state. On a daily basis, the leader system and follower system determine the funds needed for transactions due to settle that day based on information derived from the public log store. The follower system then initiates a series of transfers from the omnibus sweep program accounts at participant system (that are associated with participant banks) (step C) to the leader system for settlement. The follower/holding system may also choose to transfer funds to the transient/leader system for settlement via a single transfer from one participating institution sweep account.

If this type of sweep program arrangement is chosen, by engaging a third party coordinator and providing that coordinator system (or sweep coordinator system) with public log store data, the systems can also conduct daily settlement of user transactions in a manner insulated from downtime, failure, or processing delays or deadlines at third-party institutions by settling user transactions occurring through the transient system from a sweep account maintained by that same transient Institution. In this scenario, the coordinator system conducts any necessary cross-participating-bank transactions, relieving the holding institution of this responsibility. The flow of funds and information in such an arrangement is illustrated and described in FIG. 8.

Figure 8:
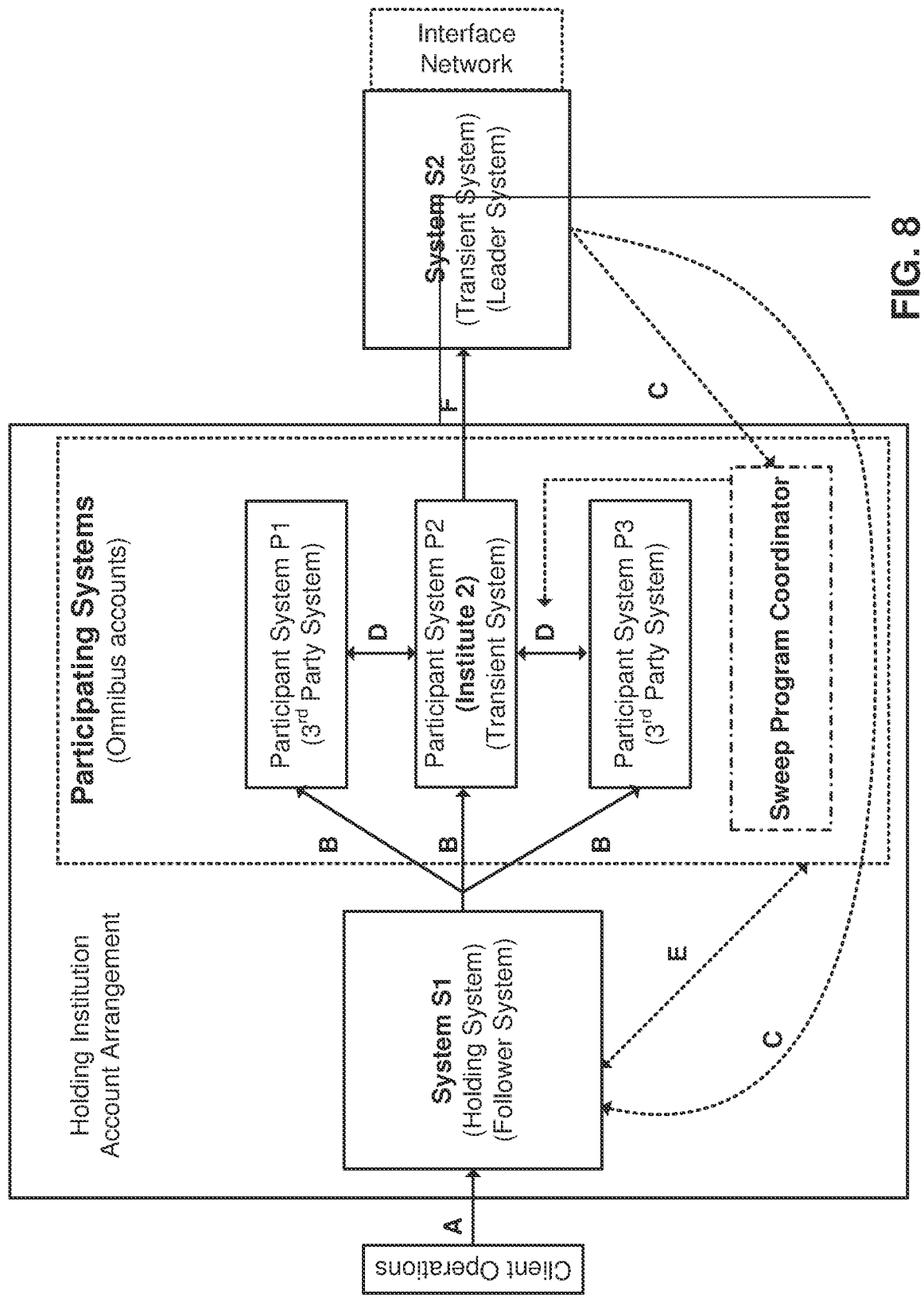
FIG. 8 shows interactions between a follower system and a leader system and a coordinator system, in accordance with another embodiment.

FIG. 8 shows interactions between a follower system and a leader system and a coordinator system, in accordance with another embodiment. FIG. 8 illustrates a sweep program arrangement of accounts and settlement (that is facilitated by the coordinator system.) Solid arrows represent the movement of funds or accounting entries and dashed arrows represent the movement of information or instructions only.

The holding system (system S1) receives requests for client operations (e.g., user deposits). The holding system receives client deposits (step A) and updates its private log store and the public log store. Rather than holding these funds itself, the holding systems transfers the funds into interest-bearing omnibus accounts in the holding Institution's name for the benefit of users at one or more third-party systems (associated with third-party institutions participating in an FDIC-insured sweep program) (step B). The holding system can seek to maximize protection by distributing these funds across multiple participant systems (associated with participating banks). In this scenario, the transient institution holds one of these omnibus accounts in the name of the holding institution. This omnibus account is used to hold program funds in the same manner as the omnibus accounts at third-party institutions. (In this example, the transient system associated with the transient institution is shown as 'Participant System 2.')

As in the scenario described above, on a daily basis, the holding system and transient system exchange information stored in the public log store listing expected settlement totals for the day. The holding system and transient system reconcile their records and agree on the per-user settlement amounts required for card network transactions executed through the transient Institution that must settle that day.

The transient system cannot directly settle transactions using funds in the omnibus sweep program account held at the transient system, because (1) the omnibus account is in the name of the holding Institution for the benefit of clients, and (2) the funds in the sweep account at the transient Institution are not necessarily held for the benefit of those specific clients whose transactions must settle. The transient system can be granted a security interest in the sweep account it holds, up to the amount of funds required for settlement, as an additional backstop against potential system failure or downtime.

The coordinator system coordinates the complete settlement between the transient system and the holding system. The transient system sends a data file derived from the reconciled public log store setting forth the agreed-upon settlement amounts per client to the holding system and the coordinator system (step C) requesting settlement for user.

The coordinator system, which manages the sweep program, has visibility into which user's funds are held in each participating system's omnibus sweep account. The coordinator system then directs and executes a series of book-entry-only transactions (step D) to reallocate and retitle (shuffle') users balances between and among the various participant system's omnibus sweep accounts, until all of the specific users whose transactions are due for immediate settlement have at least the amount of funds required for that settlement held in the omnibus sweep account at the transient system.

The coordinator system sends the results of the reallocation/shuffling process to the holding system (step E), which confirms the reallocation transactions and the resulting distribution of funds across sweep accounts based on its private log store records and its records of which user's funds are held in each participating system's omnibus sweep account.

Once it has confirmed the reallocation transactions and confirmed that the omnibus sweep account held at the transient system (1) contains the amount of funds required for daily settlement and (2) comprises funds allocated to the specific individual clients whose transactions must settle (and in the correct amounts), the holding system authorizes and instructs the transient system to perform a transfer transaction that transfers an amount equal to the total net daily settlement amount out of the omnibus sweep program account held by the transient system (and therefore out of a holding Institution account) and into a proprietary account of transient Institution (step F).

Because this settlement transaction (step F) is a book-entry-only transaction executed by the transient Institution, it can occur irrespective of transfer cutoff times and is insulated from external system failures or downtime. The transient system executes this transfer and uses the daily settlement to pay its own obligations and update user accounts on its private log store and the public log store.

The transient system may also choose to directly perform the functions that are delegated to the coordinator system. The transient and holding systems may prefer to interpose an independent third party as the coordinator system for considerations relating to resource availability/efficiency, additional verification, or the like.

Technical Improvements

The systems disclosed herein provide several technical improvements.

The systems offer improved verifiability. The systems may not share the contents of their private log stores with each other. The systems use the contents of the public log store and the public log totals are sufficient to verify the accuracy of each user's history and to facilitate periodic settlement between the two systems. When both systems are online the two systems periodically compare the entries and resulting totals of their public log stores, discounting recent entries that may not have been polled yet in the update queue. The systems ensure that the public log stores match.

The disclosed techniques allow efficient settlement across the systems 100. Unlike technologies like blockchain, this process does not mix balance synchronization and settlement. A blockchain when used as a distributed financial system tightly links data transfer and settlement: the collective knowledge of which user owns which bitcoin during a transfer is inextricably linked with the actual transfer of bitcoin. This is distinct from traditional financial systems, making blockchain technologies difficult to adopt. While real world users want their balance transfers to appear instant (speed of data), it is useful for the backing institutions to group together and delay transfers of funds between each other (speed of settlement) without affecting any user experience. The techniques disclosed according to various embodiments enables this use case. Log entries flow in realtime between systems and public log stores, allowing users to feel like funds transfers are instant, while applications can, on an independent time schedule, compare and update private log stores to enable settlement of funds.

The flexibility of enabling settlement without affecting realtime data flow allows higher-level arrangements for the institutions involved. Most notably, the institutions can enter an agreement to hold all of a user's real balances at a single institution in the steady state, while retaining the ability to hold private balances on their private log stores, preventing users from double-spending, and still being insulated from failure at the other institution. This techniques is referred to as sweeping settlement and is completed using only the shared information available in the system's public log stores. The institutions agree that one should be the recipient of all client balances in the steady state (also referred to as the holding system associated with a holding institution), and periodically tally up entries in the public log stores entered by the other system (the transient system associated with the transient institution). This is the amount the transient system should transfer to the holding system before adjusting for user-level overdrafts.

In the case that a user forcibly overspends their account, creating an overdraft, the transient system adjusts downwards the settlement amount for a given user, capping it to the difference between the difference between the transient system's public log store and private log store balance of the user. As a natural consequence of this system, this difference always represents the maximum amount the holding system agrees to settle (they could be privately withholding part of the user's balance).

Institutions can also enter into arrangements that simultaneously permit funds to be held in a sweep program while enabling just-in-time settlement, by which the funds needed to settle transactions remain in the interest-bearing sweep accounts as long as possible and are only transferred to a settlement account with the settling institution (the leader and transient institution) immediately prior to the time at which settlement must occur.

This sweep program arrangement can also be achieved in a manner that provides additional insulation against downtime, failure, or processing delays or deadlines at third-party institutions by engaging a third-party coordinator for the sweep program and maintaining funds within the sweep program in omnibus accounts at participating institutions that include the transient institution as well as third-party institutions. Settlement of user's transactions between the leader institution and funds held with the follower system in the sweep program is enabled by providing daily summaries of changes in the public log store to the sweep coordinator. The sweep coordinator executes a series of book entry transfers and suggests a series of transfer transactions (e.g., wires) between the sweep program systems (associated with sweep program banks) and the leader system, which, when executed by the follower system, bring the leader system back into the steady state of holding no client debits or credits. The settlement process is therefore insulated against downtime, failure, or processing delays or deadlines at third-party institutions as noted above.

Embodiments further provide improved liveness. At any point, either system can suffer technological failure, and users will still be able to interact with the other system, likely run by a different institution. Log entries to the other institution will back up in the update queues and the two public log totals will diverge. However, the single unsafe operation, negative log entries entered via the follower system by more funds than indicated by the leader's public log store, are delayed. However, by netting backed up log entries in this queue, and by only blocking synchronization of negative log entries, the follower system can in many cases continue to provide useful services to users during leader downtime. During follower system downtime, log entries submitted to the leader system are unaffected.

Architecture of Computer

Figure 9:
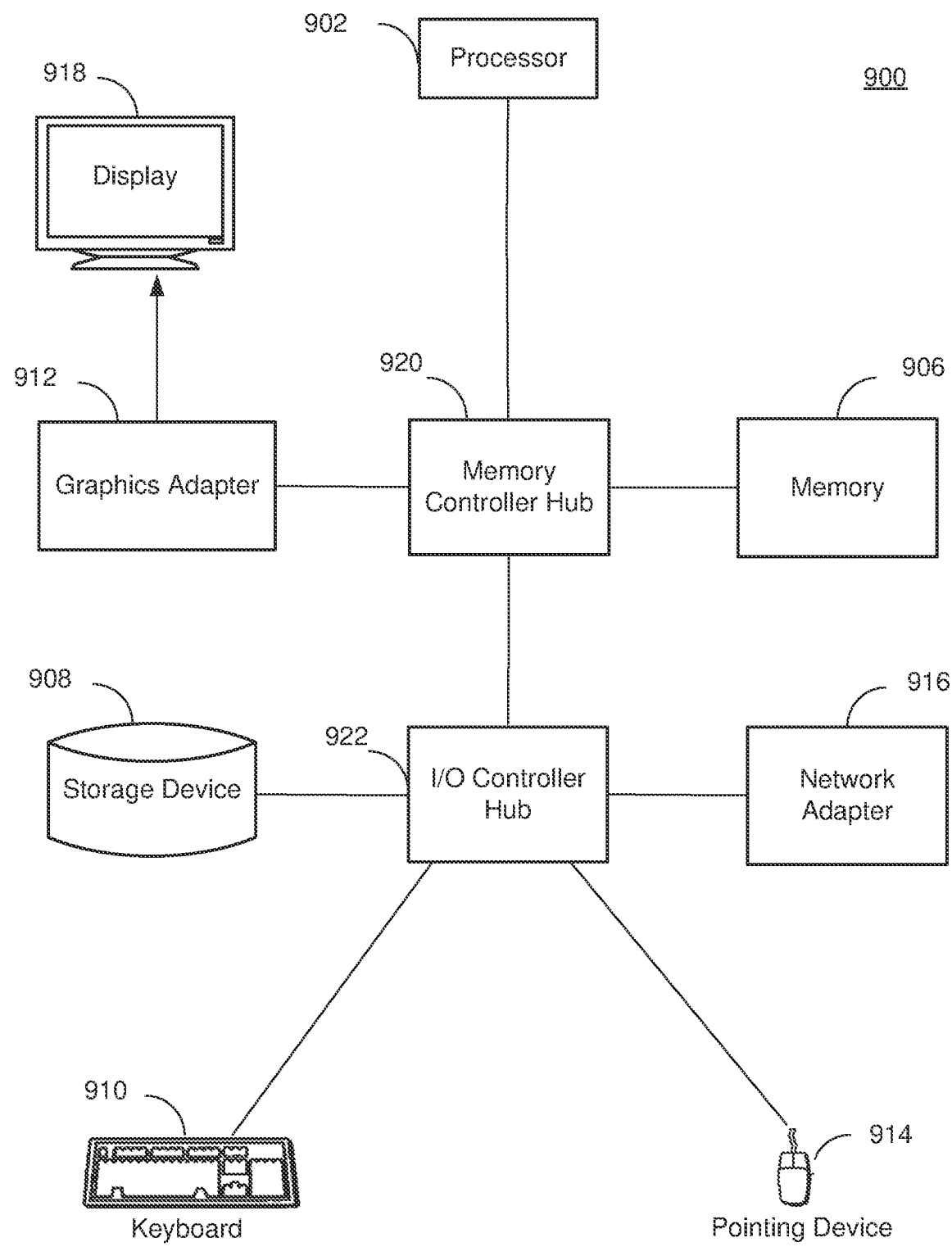
FIG. 9 shows an architecture of a computer that may be used for executing modules of systems shown in FIG. 1, in accordance with another embodiment.

FIG. 9 is a high-level block diagram illustrating an example of a computer 900 for use as one or more of the entities illustrated in FIG. 1, according to one embodiment. Illustrated are at least one processor 902 coupled to a memory controller hub 920, which is also coupled to an input/output (I/O) controller hub 922. A memory 906 and a graphics adapter 912 are coupled to the memory controller hub 922, and a display device 918 is coupled to the graphics adapter 912. A storage device 908, keyboard 910, pointing device 914, and network adapter 916 are coupled to the I/O controller hub. The storage device may represent a network-attached disk, local and remote RAID, or a SAN (storage area network). A storage device 908, keyboard 910, pointing device 914, and network adapter 916 are coupled to the I/O controller hub 922. Other embodiments of the computer 900 have different architectures. For example, the memory is directly coupled to the processor in some embodiments, and there are multiple different levels of memory coupled to different components in other embodiments. Some embodiments also include multiple processors that are coupled to each other or via a memory controller hub.

The storage device 908 includes one or more non-transitory computer-readable storage media such as one or more hard drives, compact disk read-only memory (CD-ROM), DVD, or one or more solid-state memory devices. The memory holds instructions and data used by the processor 902. The pointing device 914 is used in combination with the keyboard to input data into the computer 900. The graphics adapter 912 displays images and other information on the display device 918. In some embodiments, the display device includes a touch screen capability for receiving user input and selections. One or more network adapters 916 couple the computer 900 to a network. Some embodiments of the computer have different and/or other components than those shown in FIG. 9. For example, the database system can be comprised of one or more servers that lack a display device, keyboard, pointing device, and other components, while a client device acting as a requester can be a server, a workstation, a notebook or desktop computer, a tablet computer, an embedded device, or a handheld device or mobile phone, or another type of computing device. The requester to the database system also can be another process or program on the same computer on which the database system operates.

The computer 900 is adapted to execute computer program modules for providing functionality described herein. As used herein, the term "module" refers to computer program instructions and/or other logic used to provide the specified functionality. Thus, a module can be implemented in hardware, firmware, and/or software. In one embodiment, program modules formed of executable computer program instructions are stored on the storage device, loaded into the memory, and executed by the processor.

Additional Considerations

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention.

What is claimed is:

1. A computer-implemented method comprising:
storing records for a plurality of users in each of a follower system and a leader system, the stored records comprising a record for a user, the record comprising a field storing a value;
storing by each of the follower system and the leader system, a set of private logs and a set of public logs, wherein public logs from the set of public logs are periodically synchronized across the follower system and the leader system;
receiving, by the follower system, a set of update requests, each update request specifying a proposed increase in the value of the field of the record of the user;
executing, by the follower system, a set of transactions corresponding to each updated request of the update requests of the set of update requests, and storing information describing the set of transactions in the set of private logs, the set of transactions executed prior to synchronizing public logs with the leader system;
receiving, by the follower system, a new update request specifying a proposed decrease in the value of the field of the record of the user; and
synchronizing, by the follower system, changes to public logs with the leader system in response to receiving the new update request.

2. The computer-implemented method of claim 1, wherein public logs of each of the follower system and the leader system are periodically synchronized with other system of the follower system and the leader system, and wherein the private logs of each of the follower system and the leader system is maintained independent of the other system.

3. The computer-implemented method of claim 2, wherein the set of private logs and set of public logs store information describing operations associated with the user that modify the field of the record of the user.

4. The computer-implemented method of claim 2, wherein the set of private logs and the set of public logs further store values of fields of record of the user obtained by performing an operation.

5. The computer-implemented method of claim 1, wherein the follower system determines an aggregate value of the field responsive to performing a plurality of operations and sends the aggregate value to the leader system via the public log.

6. The computer-implemented method of claim 1, wherein the follower system synchronizes with the leader system responsive to receiving an operation specifying a proposed decrease in value of the field of the record of the user but allows a plurality of operations each specifying a proposed increase in value before synchronizing with the leader system.

7. The computer-implemented method of claim 1, wherein the leader system performs operations specifying proposed decreases in value of the field of the record of the user as well as operations specifying proposed increases in value of the field without synchronizing with the follower system.

8. The computer-implemented method of claim 1, wherein each of the follower system and the leader system is associated with a financial institution, wherein a record represents an account of a user, wherein the field represents a value of the account of the user.

9. The computer-implemented method of claim 8, wherein an increase in the value of the field of the account of the user is associated with a deposit operation and a decrease in the value of the field of the account of the user is associated with a withdrawal of the account of the user.

10. A non-transitory computer readable storage medium storing instructions that when executed by one or more computer processors, cause the one or more computer processors to:
store records for a plurality of users in each of a follower system and a leader system, the stored records comprising a record for a user, the record comprising a field storing a value;
store by each of the follower system and the leader system, a set of private logs and a set of public logs, wherein public logs from the set of public logs are periodically synchronized across the follower system and the leader system;
receive, by the follower system, a set of update requests, each update request specifying a proposed increase in the value of the field of the record of the user;
execute, by the follower system, a set of transactions corresponding to each updated request of the update requests of the set of update requests, and storing information describing the set of transactions in the set of private logs, the set of transactions executed prior to synchronizing public logs with the leader system;
receive, by the follower system, a new update request specifying a proposed decrease in the value of the field of the record of the user; and
synchronize, by the follower system, changes to public logs with the leader system in response to receiving the new update request.

11. The non-transitory computer readable storage medium of claim 10, further storing instructions that when executed cause each of the follower system and the leader system to periodically synchronize the public logs with other system of the follower system and the leader system, and wherein the private logs of each of the follower system and the leader system is maintained independent of the other system.

12. The non-transitory computer readable storage medium of claim 11, wherein the set of private logs and set of public logs store information describing operations associated with the user that modify the field of the record of the user.

13. The non-transitory computer readable storage medium of claim 11, wherein the set of private logs and the set of public logs further store values of fields of record of the user obtained by performing an operation.

14. The non-transitory computer readable storage medium of claim 10, further storing instructions that when executed cause the follower system to determine an aggregate value of the field responsive to performing a plurality of operations and sends the aggregate value to the leader system via the public log.

15. The non-transitory computer readable storage medium of claim 10, further storing instructions that when executed cause the follower system to synchronize with the leader system responsive to receiving an operation specifying a proposed decrease in value of the field of the record of the user but allows a plurality of operations each specifying a proposed increase in value before synchronizing with the leader system.

16. The non-transitory computer readable storage medium of claim 10, further storing instructions that when executed cause the leader system to perform operations specifying proposed decreases in value of the field of the record of the user as well as operations specifying proposed increases in value of the field without synchronizing with the follower system.

17. The non-transitory computer readable storage medium of claim 10, wherein each of the follower system and the leader system is associated with a financial institution, wherein a record represents an account of a user, wherein the field represents a value of the account of the user.

18. The non-transitory computer readable storage medium of claim 17, wherein an increase in the value of the field of the account of the user is associated with a deposit operation and a decrease in the value of the field of the account of the user is associated with a withdrawal of the account of the user.

19. A computer system comprising: one or more computer processors; and a non-transitory computer readable storage medium storing instructions that when executed by the one or more computer processors, cause the one or more computer processors to:
 store records for a plurality of users in each of a follower system and a leader system, the stored records comprising a record for a user, the record comprising a field storing a value;
 store by each of the follower system and the leader system, a set of private logs and a set of public logs, wherein public logs from the set of public logs are periodically synchronized across the follower system and the leader system;
 receive, by the follower system, a set of update requests, each update request specifying a proposed increase in the value of the field of the record of the user;
 execute, by the follower system, a set of transactions corresponding to each update request of the update requests of the set of update requests, and storing information describing the set of transactions in the set of private logs, the set of transactions executed prior to synchronizing public logs with the leader system;
 receive, by the follower system, a new update request specifying a proposed decrease in the value of the field of the record of the user; and
 synchronize, by the follower system, changes to public logs with the leader system in response to receiving the new update request.

20. The computer system of claim 19, further storing instructions that when executed cause each of the follower system and the leader system to periodically synchronize the public logs with other system of the follower system and the leader system, and wherein the private logs of each of the follower system and the leader system is maintained independent of the other system.

21. The computer system of claim 20, wherein the set of private logs and the set of public logs further store values of fields of record of the user obtained by performing an operation.

22. The computer system of claim 19, further storing instructions that when executed cause the follower system to determine an aggregate value of the field responsive to performing a plurality of operations and sends the aggregate value to the leader system via the public log.

23. The computer system of claim 19, further storing instructions that when executed cause the follower system to synchronize with the leader system responsive to receiving an operation specifying a proposed decrease in value of the field of the record of the user but allows a plurality of operations each specifying a proposed increase in value before synchronizing with the leader system.

24. The computer system of claim 19, further storing instructions that when executed cause the leader system to perform operations specifying proposed decreases in value of the field of the record of the user as well as operations specifying proposed increases in value of the field without synchronizing with the follower system.

25. The computer system of claim 19, wherein each of the follower system and the leader system is associated with a financial institution, wherein a record represents an account of a user, wherein the field represents a value of the account of the user.

26. The computer system of claim 25, wherein an increase in the value of the field of the account of the user is associated with a deposit operation and a decrease in the value of the field of the account of the user is associated with a withdrawal of the account of the user.

* * * * *